(No Model.)
J. D. HOBBS.
STUFFING BOX GLAND.
No. 341,330. Patented May 4, 1886.
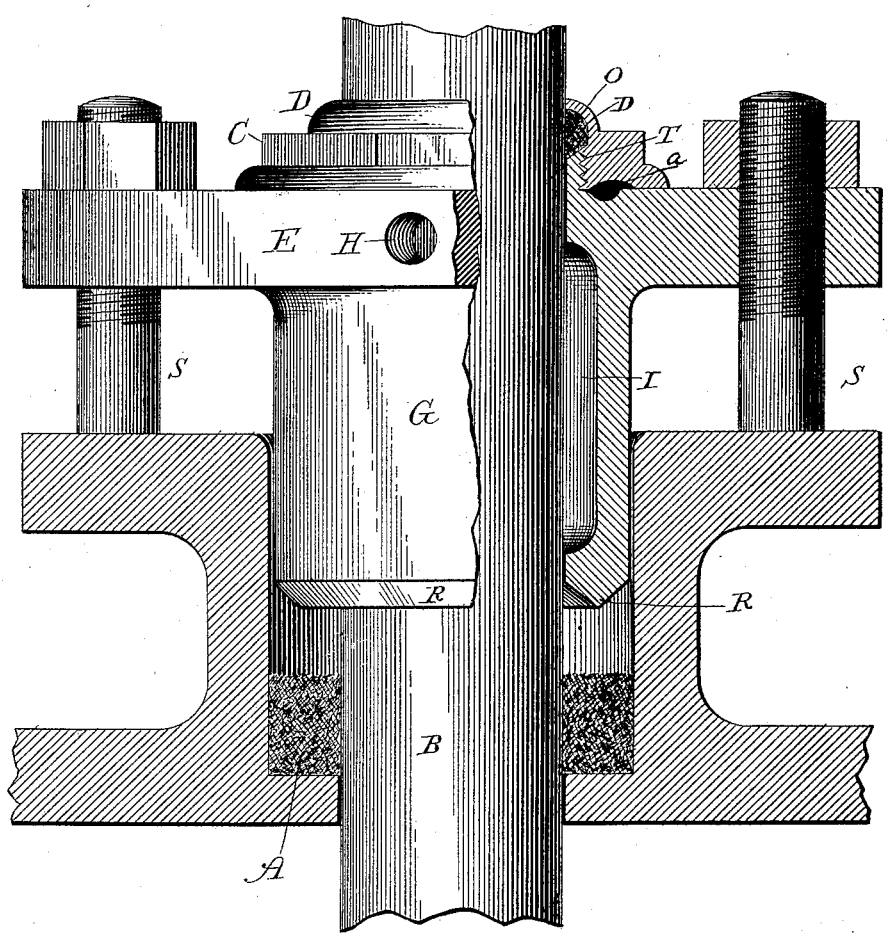
Witnesses:
John Robertson
Albert L. Robertson
Inventor:
Joseph D. Hobbs

UNITED STATES PATENT OFFICE.

JOSEPH D. HOBBS, OF JOLIET, ILLINOIS.

STUFFING-BOX GLAND.

SPECIFICATION forming part of Letters Patent No. 341,330, dated May 4, 1886.

Application filed February 17, 1886. Serial No. 192,278. (No model.)

*To all whom it may concern:*

Be it known that I, JOSEPH D. HOBBS, a citizen of the United States, residing at Joliet, in the county of Will and State of Illinois, have invented a new and useful Improvement in Steam-Engine Piston-Packing Glands, of which the following is a specification.

My invention relates to piston-rod packing; and it consists of the devices and combinations of devices hereinafter fully described, and specifically claimed.

The object of the invention is to provide means by which waste of steam is prevented, friction avoided, and consequent wearing of the piston-rod and saving made in the use of packing.

In the accompanying drawing the figure represents a section of a cylinder-head, with the packing-gland in side elevation, partly broken away, and with a portion of the piston-rod in elevation. The piston-rod is represented at B, and passes through the stuffing-box formed in the head of the cylinder, the stuffing-box containing the packing for lubricating the said piston-rod, the packing being shown at A. Projecting from the outer end of the cylinder, upon either side of the chamber containing the packing, are bolts *s s*, screw-threaded, as shown, and these bolts receive a guide-flange, E, of the packing-gland G. This gland, as shown in the figure, is adapted to enter the recess formed to receive the packing, and encircles the piston-rod B. The lower edge has a projecting rib, R, which is approximately V-shaped in cross-section. The gland at its upper and lower part, on its inner periphery, is of less diameter than at its central portion between these two points, thus forming an oil-chamber, I, the space between the portions of less diameter and the piston-rod being sufficient to allow the passage of oil through the same to the packing below. The gland has a screw-threaded portion, T, extending above the plane of its projecting flange E, and the flange-nut C is fitted thereto, so as to close up the opening at the upper part. The part D of this nut C bears against the piston-rod, as shown, and has an inner recess, which is filled with packing O, this packing being kept supplied with oil by that which it receives from the piston-rod in its reciprocation back and forth. A gasket, *a*, is placed in the recess between the nut C and the top of the flange E, in order to make a tight joint at this point. An opening, H, is formed in the flange E, extending into the oil-chamber I, and through this opening oil may be supplied to this chamber. This opening may be closed by a screw-plug or any suitable means.

By the construction above described, after the oil has been supplied to the chamber, the gland is forced down upon the opening within the packing-chamber by means of turning the screws fitted upon the bolts *s s*, and this forces the gland down upon the packing. The result of this action is, that the projecting point R of the gland enters the packing O and compresses the center part thereof, thus loosening the packing next to the piston-rod, where all the wear and the heating takes place, and by thus loosening the packing the oil can better circulate, and the piston be lubricated in a more regular and perfect manner. The compression of the central part of the packing also forces the oil to the sides. As the oil-chamber I is connected with the packing-chamber by means of an opening immediately alongside of the piston-rod the oil passes down along the periphery of the said piston-rod directly to the loose edges of the packing surrounding the rod. It will be understood that any amount of pressure may be placed upon the gland G, to take up any wear that may occur in the packing, and for this reason the packing will last for a long time.

I claim as my invention—

1. In combination, a packing-box, a piston-rod, and the packing-gland having a V-shaped lower edge, and an oil-chamber between said gland and the piston rod, substantially as described.

2. The combination, with the packing-box and the piston, of a packing-gland having a V-shaped lower edge adapted to compress the packing, an oil-chamber, I, and a nut, C, at its upper end, having a packing-chamber, D, and packing O, contained therein, substantially as described.

JOSEPH D. HOBBS.

Witnesses:
A. F. KNOX,
M. J. MACOMBER.